Feb. 1, 1966  J. REESEN  3,232,810
METHOD FOR DIELECTRIC SEALING OF POLYESTER MATERIALS
Filed July 6, 1960  2 Sheets-Sheet 1
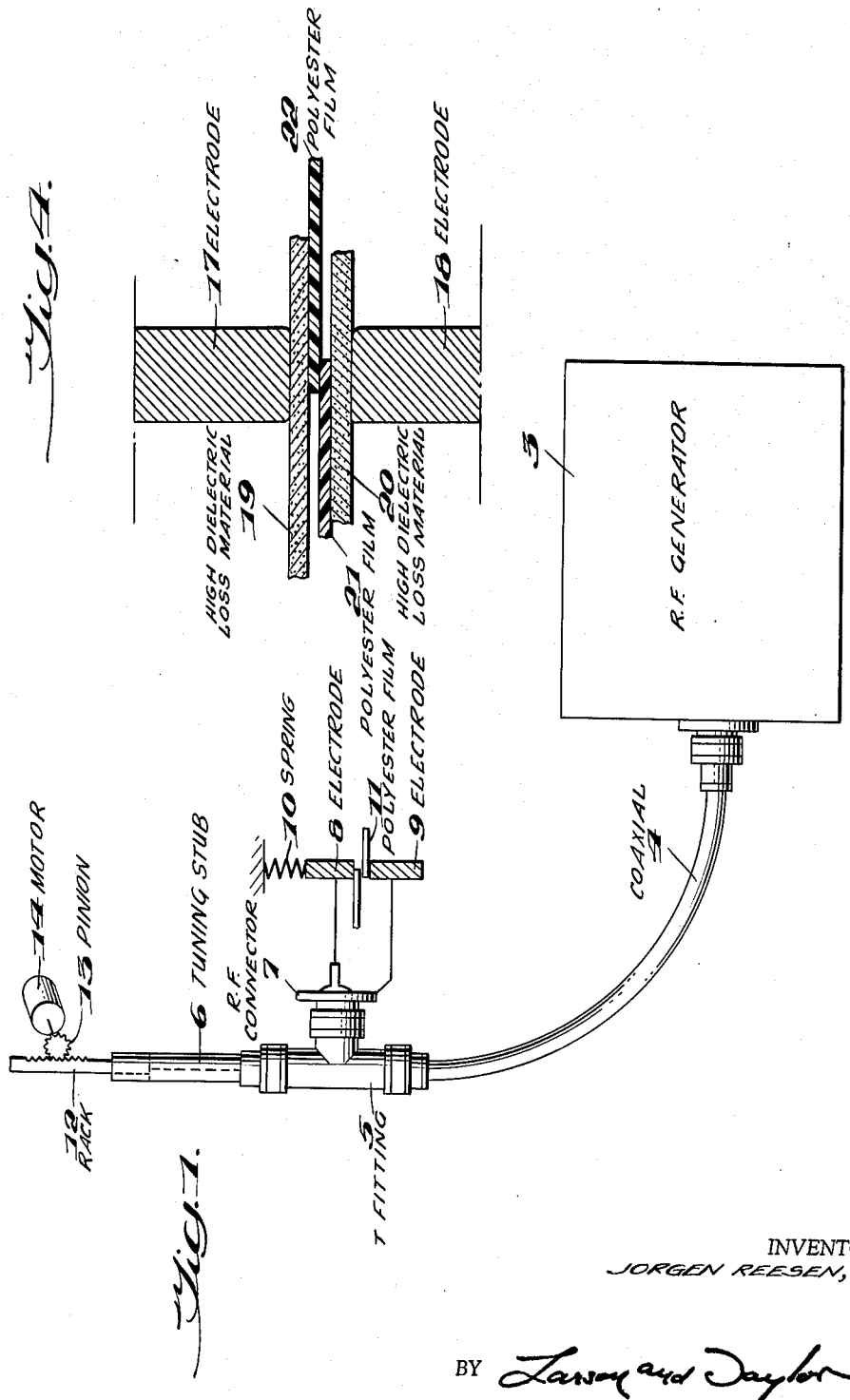
INVENTOR
JORGEN REESEN,
BY *Lanyon and Taylor*
ATTORNEYS

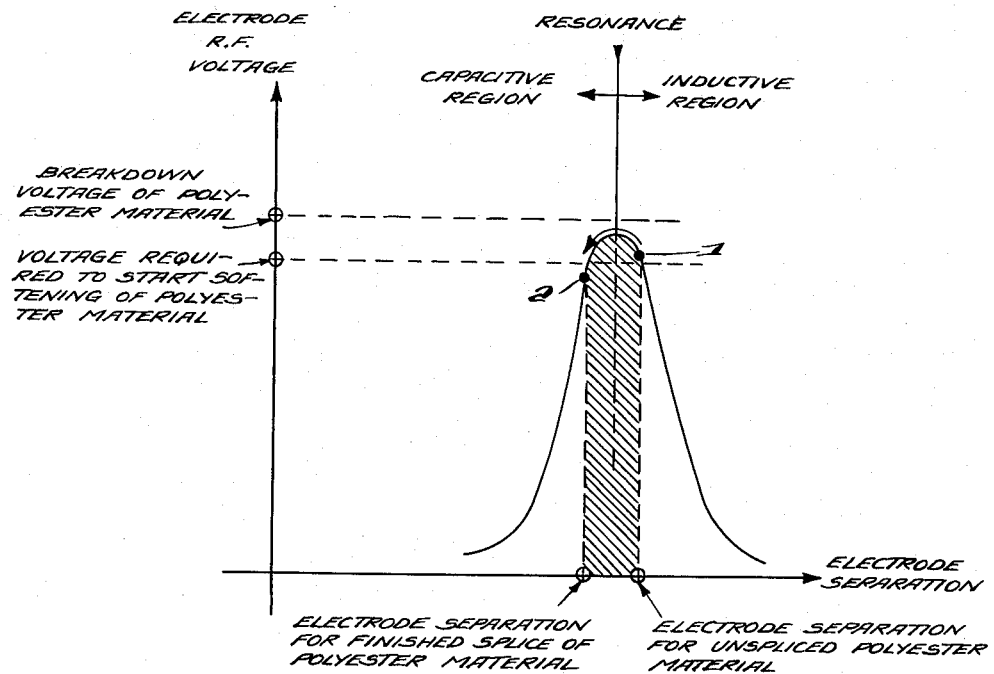
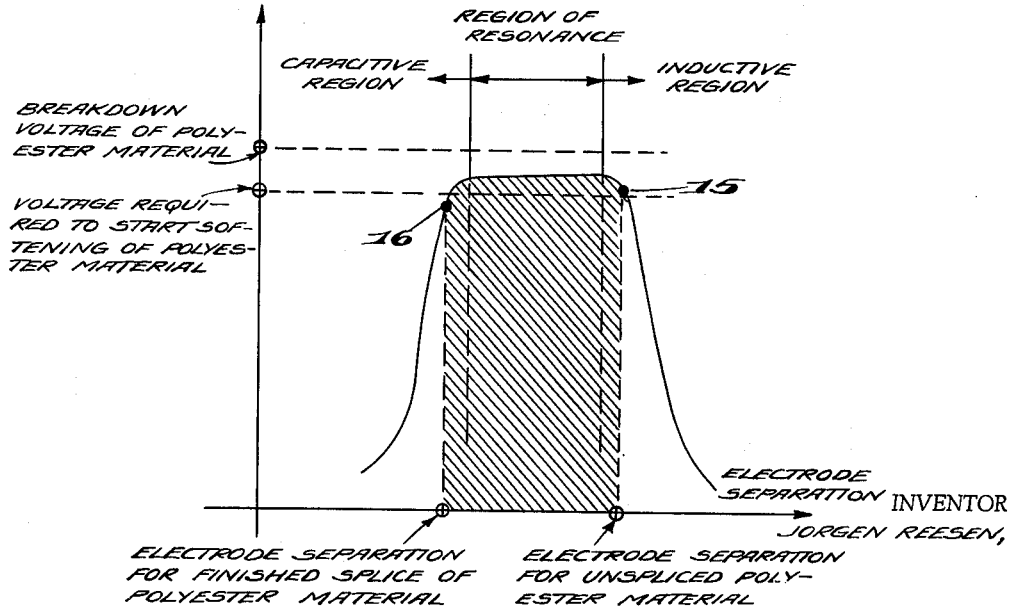

United States Patent Office 3,232,810
Patented Feb. 1, 1966

3,232,810
METHOD FOR DIELECTRIC SEALING OF
POLYESTER MATERIALS
Jorgen Reesen, Rochester, N.Y., assignor to Eastman
Kodak Company, Rochester, N.Y., a corporation of
New Jersey
Filed July 6, 1960, Ser. No. 41,175
6 Claims. (Cl. 156—273)

The present invention relates to a method and apparatus for dielectric splicing and more particularly to such a method and apparatus which is especially well suited for splicing polyester materials.

Dielectric heating has been used extensively for splicing of plastic films and according to known prior art methods electrodes are applied to the material to be spliced, the electrodes being connected to a radio frequency generator. The heating of the material is effected by dielectric loss resulting from the electrostatic stressing of the material. In conventional prior art processes, means is provided to tune the circuit at or near resonance so that sufficient voltage is applied to the material to cause it to be heated to the softening point of the material. As the material softens the spacing between the electrodes is reduced and consequently the capacitance increases. When this occurs the circuit will be tuned off resonance and the voltage will be lowered sufficiently to permit cooling of the material. This process has been found to be highly satisfactory in connection with sealing materials such as cellulose acetate and polyvinyls which soften under heat over a wide temperature range and have a relatively high dielectric loss factor. However, in connection with sealing polyester with this same process difficulties have been experienced.

Polyesters have only a very narrow range of softening at temperatures immediately below the melting point and the dielectric loss factor is quite small. The following table is illustrative of the comparative values of cellulose acetate and polyester:

| | Softening Range, °C. | Melting Point, °C. | Dielectric Loss Factor |
|---|---|---|---|
| Cellulose acetate (unplasticized) | 160–230 | 272 | .03 |
| Polyester | 240–245 | 250–255 | .003 |

By polyester is meant a condensation polymer of dicarboxylic acid such as terephthalic acid and a glycol such as ethylene glycol, 1,4-cyclohexane dimethanol, etc., which is capable of being formed into films which can be biaxially oriented. The polyesters substantially composed of terephthalic acid and ethylene glycol is sold under the trade name of "Mylar." It can thus be appreciated that higher temperatures are required to seal polyester and, since this material has such a low dielectric loss factor, substantially higher R.F. voltages are essential to supply the requisite heat. Furthermore the breakdown voltage of polyester, the voltage at which the electrodes arc across and puncture the material, is comparatively close to the voltage necessary to soften the material. Thus, when sealing polyester according to prior art methods it has been found that only a relatively poor, easily torn, seal was obtainable. This is due to the fact that the material when softened compresses between the electrodes and immediately the voltage drops below the minimum essential to maintain the polyester molten. Thus insufficient softening and compression of the material has taken place to form a satisfactory weld of the sheets of material being spliced.

According to the presently disclosed method and apparatus the aforementioned disadvantages are overcome by providing means for maintaining a constant voltage between the electrodes for a predetermined period of time so that sufficient softening and compression of the polyester occurs to produce a satisfactory seal. This is achieved by commencing the sealing operation with the circuit tuned on the inductive side of resonance and providing means for decreasing the inductance in the circuit at a predetermined constant rate so that the voltage between the electrodes applied to the polyester remains relatively constant despite variation in the electrode spacing. Sealing continues as long as the inductance is varied. However, once the limit of inductance variation is reached, further compression of the material and increased capacitance is not compensated for by reduced inductance and the voltage drops below the softening point of the polyester.

According to one embodiment of the present invention, a pair of electrodes is connected through a coaxial T-fitting and coaxial cable with a radio frequency power generator. The tuning stub of the fitting is driven by a motor through a rack and pinion gearing. The electrodes are spring urged into engagement with the material being sealed and, when the radio frequency voltage is applied to the electrodes, the tuning stub is driven between end positions by the motor. The sealing operation will continue for a length of time determined by the distance through which the tuning stub is driven and the speed of the motor.

An object of the invention is to provide a method and apparatus for dielectrically sealing and splicing materials having a low dielectric loss factor and relatively narrow softening temperature range.

A further object of the present invention is to provide a method and apparatus for sealing polyester material by dielectric heating means including circuit means for varying the inductance at a predetermined constant rate.

Still another object of the present invention is to provide in a dielectric heating apparatus means for maintaining the voltage across the electrodes substantially constant throughout the sealing operation despite variation in the thickness of material being sealed.

Other objects and many of the attendant advantages of the present invention will become more fully apparent upon consideration of the following detailed specification taken in connection with the accompanying drawing wherein:

FIG. 1 is a diagrammatic view of an apparatus according to the present invention, FIG. 2 is a graph plotting electrode separation and voltage illustrating polyester sealed by prior art methods, FIG. 3 is a graph similar to that shown in FIG. 2 showing polyester sealed according to the present invention and, FIG. 4 is a sectional view through the electrodes and material being sealed showing a modification of the method and apparatus.

The method of and apparatus for sealing materials by dielectric heating are well known in the art. For example there is disclosed on page 14 of the January 1957 issue of the Journal of the SMPTE a "Method Using Dielectric Heating for Splicing Motion Picture Film." The circuit generally comprises a high frequency generator in combination with a reactive impedance circuit. The material to be sealed is disposed between electrodes and is heated by dielectric loss through electrostatic stressing when the circuit is tuned to resonance. Spring means or the like is generally utilized to maintain the electrodes in contact with the material. As the material softens under heat and the electrodes are spaced closer together, the capacitance of the circuit increases and the circuit is detuned off resonance thereby decreasing the voltage to a point where the material cools in a bonded or spliced condition.

It is also known in the prior art to provide mechanical linkages between the electrodes and other electrical circuit components so as to compensate for changes in electrode spacing by varying the characteristics of the other electrical components to maintain the voltage applied to the electrodes at a desired value. Examples of means for accomplishing these results are found in U.S. Patents 2,572,226; 2,563,098 and 2,596,727

The dielectric sealing of polyester presents problems which cannot be solved by application of any of the aforementioned known methods. A low dielectric loss factor and a narrow softening temperature range are characteristics of this material which result in a poor seal being formed by conventional methods. In FIG. 2 there is shown a graph of voltage plotted against electrode separation in a conventional dielectric sealing of polyester. It will be noted that the breakdown voltage of the polyester material is close to the voltage required to start softening of the polyester material. The circuit is initially tuned on the inductive side of resonance and the splicing of the material commences at point 1. The material is compressed between the electrodes as it is heated and the circuit is tuned through resonance to the capacitive region where the voltage drops off to the point where it is insufficient to maintain the material in a molten state and the splicing operation is completed at point 2. This splice is not sufficiently well formed due to the fact that the heating of the material has not been accompanied by sufficient compression of the material. This difficulty cannot be overcome by increasing the voltage between the electrodes because of the danger of exceeding the breakdown voltage and rupturing the material.

According to the present invention there is provided an apparatus such as shown in FIG. 1 for sealing polyester material. A radio frequency generator 3 is connected by a coaxial cable 4 with a T-fitting 5 having a tuning stub 6 mounted thereon. A radio frequency connector 7 connects the electrodes 8 and 9 with the T-fitting. The upper electrode is urged by means of spring 10 into contact with the material 11 to be spliced. The apparatus thus far described is conventional and any commercially available components may be used. There is provided a rack and pinion drive 12 and 13 which is used to vary the length of the tuning stub 6. The pinion gear is driven by motor 14 and, by suitably controlling the speed of motor 14 and the limits of movement of the tuning stub, the inductance of the circuit including electrodes 8 and 9 connected to the power generator 3 may be varied at a predetermined rate.

The variable tuning stub is initially tuned to make the circuit sufficiently inductive to prevent any spicing from taking place. The splicing action commences when the tuning stub actuating means, which is shortening the stub at an even predetermined rate, moves the tuning stub to a position where the circuit is close enough on the inductive side of resonance to create a voltage of sufficient strength to effect softening of the material between the electrodes. When the material softens, the distance between the electrodes decreases and the capacitance of the circuit increases thus bringing the circuit to resonance.

The tuning stub is decreasing the inductance of the circuit at a constant rate and further compression of the material cannot make the circuit sufficiently capacitive to reduce the voltage below that necessary to maintain the polyester molten until the variable tuning stub has reached the limit of its movement. Further compression of the material will then permit the circuit to become sufficiently capacitive to terminate the splicing operation.

There is shown in FIG. 3 a graph illustrating a splicing operation according to the present invention. Splicing commences at point 15 and is terminated at point 16. The voltage is maintained above that necessary to start softening of the polyester and below the breakdown voltage of the polyester material throughout the entire splicing operation and the substantial compression of the material possible by dielectric sealing according to the present invention as compared with prior art methods is evident from a comparison of FIGS. 2 and 3.

For example, dielectric splicing of Mylar has been accomplished whereas hitherto it has been found extremely difficult to splice this material satisfactorily. Using a frequency of 228 mc. seal thicknesses of .006" have been obtained splicing two .004" thick films.

The presently disclosed method and apparatus provides many advantages over prior art equipment involving mechanical linkage between the electrodes and the tuning stub. In the case of overheating with the present apparatus the thickness of material will be substantially reduced and the circuit will be detuned quicker than the constantly shortening tuning stub can return the circuit to resonance. Thus the voltage and heating will be decreased. Prior art devices utilizing mechanical linkage between the electrodes and tuning stub produce uneven splice thickness, the thickness being dependent on the duration of application of radio frequency energy. For roller-type seaming machines thickness would depend on material feed rate.

The length of time required for splicing can be arbitrarily chosen by preselecting the limits of movement of the tuning stub and by presetting the speed of the driving motor. The thickness of the splice will depend upon the ratio between initial and final tuning stub inductance. Inasmuch as the tuning stub must travel roughly one inch to allow one mil compression of the electrodes, excellent control of splice thickness is possible.

In FIG. 4 there is shown a modification of the presently disclosed method and apparatus which is particularly well suited for sealing comparatively thin films of polyester and the like. When sealing very thin films, the danger of arcing is substantially increased due to the high voltage required to generate sufficient heat to soften the polyester. By locating between the electrodes 17 and 18 a pair of sheets of material 19 and 20 which sheets have a high dielectric loss and the polyester films 21 and 22 will be spliced by a combination of heated electrodes and dielectric heating. The sheets 19 and 20 may be a material such as paper to which a nonadhesive coating is applied such as a silicone spray or the like. When a radio frequency field is applied to the electrodes 17 and 18 the sheets of material 19 and 20 will be heated to a high temperature because of their high dielectric loss and the polyester will be softened by the application of this direct heat as well as due to the dielectric loss in the polyester. Thus thin material of the order of .0025" thick can be spliced.

It will be noted in FIG. 4 that a relatively short overlap of the polyester film is required in order to form a splice. Without the presence of the sheets 19 and 20 it would be essential that the overlap extend for the full width of the electrodes 17 and 18. This is due to the fact that the air gap between the electrodes has a substantially lower dielectric constant than the polyester and the application of a high voltage to the electrodes would puncture the film between the electrodes at that portion where there is only a single thickness of film present. However, the presence of the sheets 19 and 20 obviates this difficulty and hence the method disclosed in FIG. 4 embodying the application of a combination of dielectric and direct heating permits the formation of narrower seals.

Obviously many modifications and variations of the present invention are possible in light of the above teachings. For example, the circuit could be maintained at or near resonance by varying the frequency of the radio frequency signal generated. What is claimed as new and desired to be secured by Letters Patent is:

1. In a method for dielectrically bonding super-imposed portions of thermoplastic material by applying a radio frequency voltage of predetermined frequency thereto by means of a pair of spaced opposing electrodes located in a circuit having means to vary the reactive impedance therein, said electrodes being resiliently urged into contact with said portions to compress the material during bonding, the improvement comprising:
   (a) tuning the circuit to an impedance value which is sufficiently far off resonance at said predetermined frequency to prevent such bonding upon application of said radio frequency voltage;
   (b) applying radio frequency voltage of said predetermined frequency to said circuit;
   (c) varying the reactive impedance in the circuit to bring the circuit near resonance at said frequency so that voltage across the electrodes becomes sufficient to cause softening and fusing of the superimposed portions and movement of said electrodes toward one another as said portions are compressed therebetween during fusing; and
   (d) continuing to vary said reactive impedance to maintain said circuit near resonance at said frequency to compensate for a change in capacitance caused by such movement of said electrodes during such fusing.

2. The improvement in the method in accordance with claim 1 and further comprising discontinuing the variation in reactive impedance at a predetermined time during fusing of said portions.

3. In a method for dielectrically bonding overlying portions of thermoplastic material by applying a radio frequency voltage of predetermined frequency thereto by means of a spaced pair of electrodes located in a circuit having a variable reactance element, said portions being interposed between said electrodes and said electrodes being resiliently urged toward one another to compress the material during bonding, the improvement which comprises:
   (a) adjusting the effective inductance in said circuit to a value on the high-inductance side of resonance at said frequency sufficient to prevent bonding of said portions upon application of radio frequency voltage of said frequency;
   (b) applying such radio frequency voltage across said electrodes;
   (c) decreasing the effective inductance in said circuit until voltage across said electrodes becomes sufficient to cause softening and fusing of said portions;
   (d) thereafter decreasing said inductance at a predetermined rate for a predetermined period; and
   (e) discontinuing said decrease in inductance at the end of said period to halt fusion of said materials.

4. The improvement in the method in accordance with claim 3 wherein said predetermined decrease in effective inductance is continuous and uniform during the bonding of the overlying portions of thermoplastic material.

5. The improvement in the method in accordance with claim 3 and further comprising interposing between said portions and each of said electrodes a sheet of high dielectric loss material.

6. The improvement in the method in accordance with claim 5 wherein:
   (a) each of said sheets is at least coextensive in area with the surface of the electrode adjacent thereto;
   (b) said overlying portions are lapped a distance which is limited by the width of the electrode surface on either of said electrodes, whereby the lapped material is entirely between said electrodes.

References Cited by the Examiner

UNITED STATES PATENTS

| | | | |
|---|---|---|---|
| 2,457,659 | 12/1948 | Graham et al. | 154—42 |
| 2,516,324 | 7/1950 | Joy | 219—47 |
| 2,572,226 | 10/1951 | Walstrom | 219—47 |
| 2,583,128 | 1/1952 | Stevenson et al. | 219—47 |
| 2,596,727 | 5/1952 | Rykert | 219—47 |
| 2,667,437 | 1/1954 | Zoubek | 156—380 XR |
| 2,883,505 | 4/1959 | Manwaring | 156—273 |

FOREIGN PATENTS 1,053,158   2/1954   France.

EARL M. BERGERT, *Primary Examiner.*

CARL F. KRAFFT, ALEXANDER WYMAN,
*Examiners.*